United States Patent [19]

Yakuwa et al.

[11] Patent Number: 5,003,954
[45] Date of Patent: Apr. 2, 1991

[54] FAIL-SAFE DEVICE FOR TEMPERATURE SENSORS

[75] Inventors: Masahiko Yakuwa; Tomofumi Itoh; Hisashi Igarashi, all of Wako, Japan

[73] Assignee: Honda Giken Kogyo Kabushiki Kaisha, Tokyo, Japan

[21] Appl. No.: 411,397

[22] Filed: Sep. 22, 1989

[30] Foreign Application Priority Data

Sep. 22, 1988 [JP] Japan .................................. 63-237866

[51] Int. Cl.$^5$ ............................................. F02D 41/22
[52] U.S. Cl. .................. 123/479; 123/198 D; 364/431.11
[58] Field of Search .............. 123/198 D, 479, 494; 364/431.11

[56] References Cited

U.S. PATENT DOCUMENTS 4,531,495 7/1985 Yamato et al. ...................... 123/479
4,780,826 10/1988 Nakano et al. ................. 123/479 X

FOREIGN PATENT DOCUMENTS 108831 6/1984 Japan .................................. 123/479

Primary Examiner—Tony M. Argenbright
Attorney, Agent, or Firm—Lyon & Lyon

[57] ABSTRACT

A fail-safe device for an engine temperature sensor. A value of the engine temperature detected by the engine temperature sensor is renewed and stored for engine control. While the engine is detected to be in a low temperature region lower than a predetermined value on the basis of the detected value, renewal of the detected value is inhibited when it has decreased. It is determined that the detected value has decreased, when the detected value is lower than a lower limit value. The lower limit value is set to a value corresponding to the detected value when the engine is detected to be in the low temperature region, whereas it is set to the predetermined value when the engine is detected not to be in the low temperature region. Renewal of the detected value is inhibited when the detected value has not remained within a predetermined range over a predetermined time period.

9 Claims, 7 Drawing Sheets

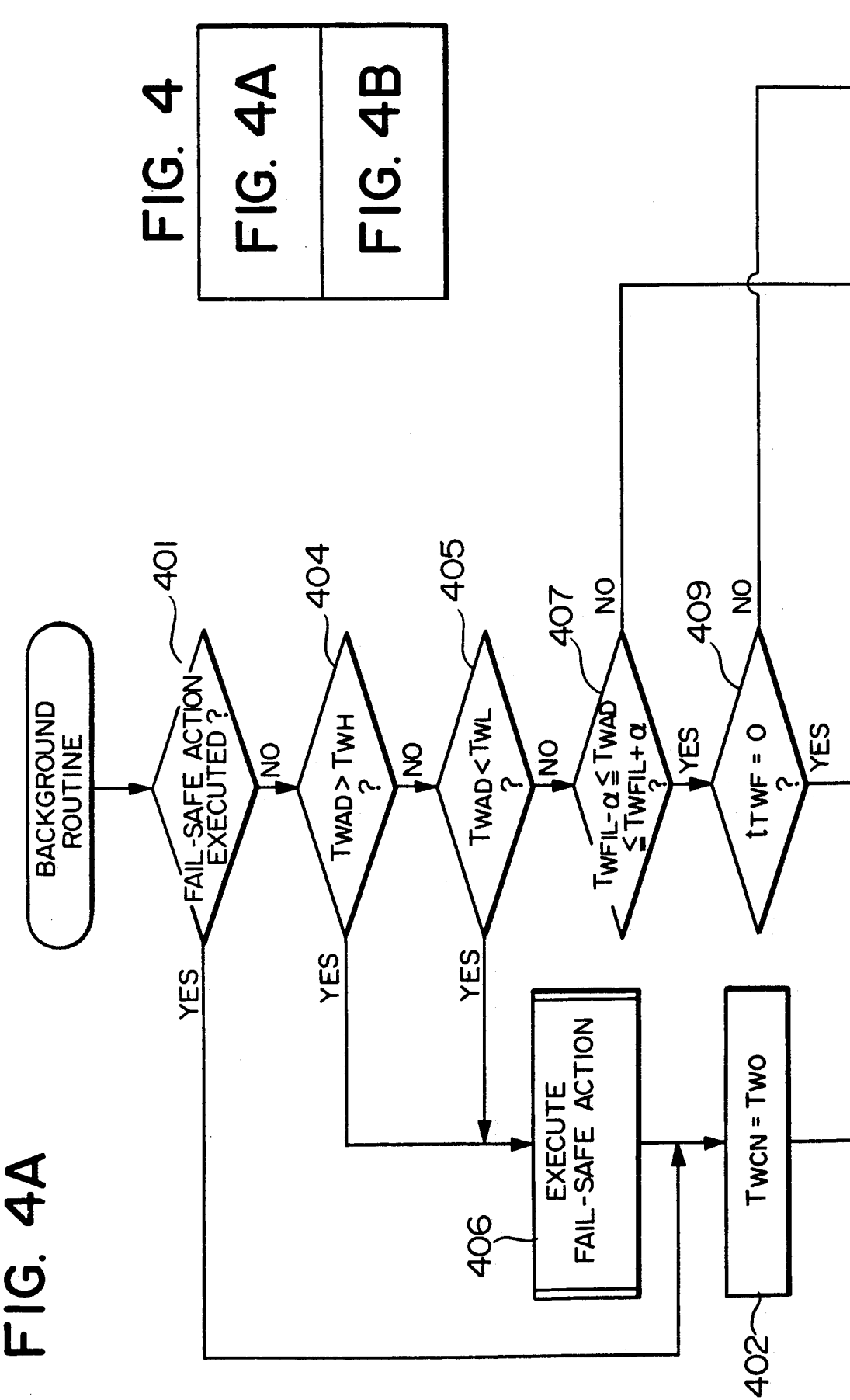

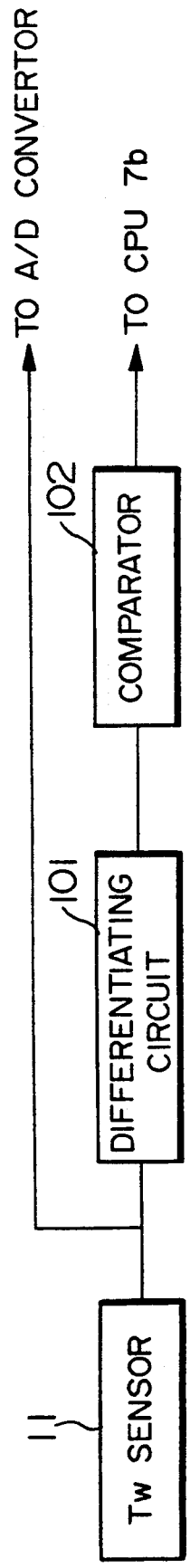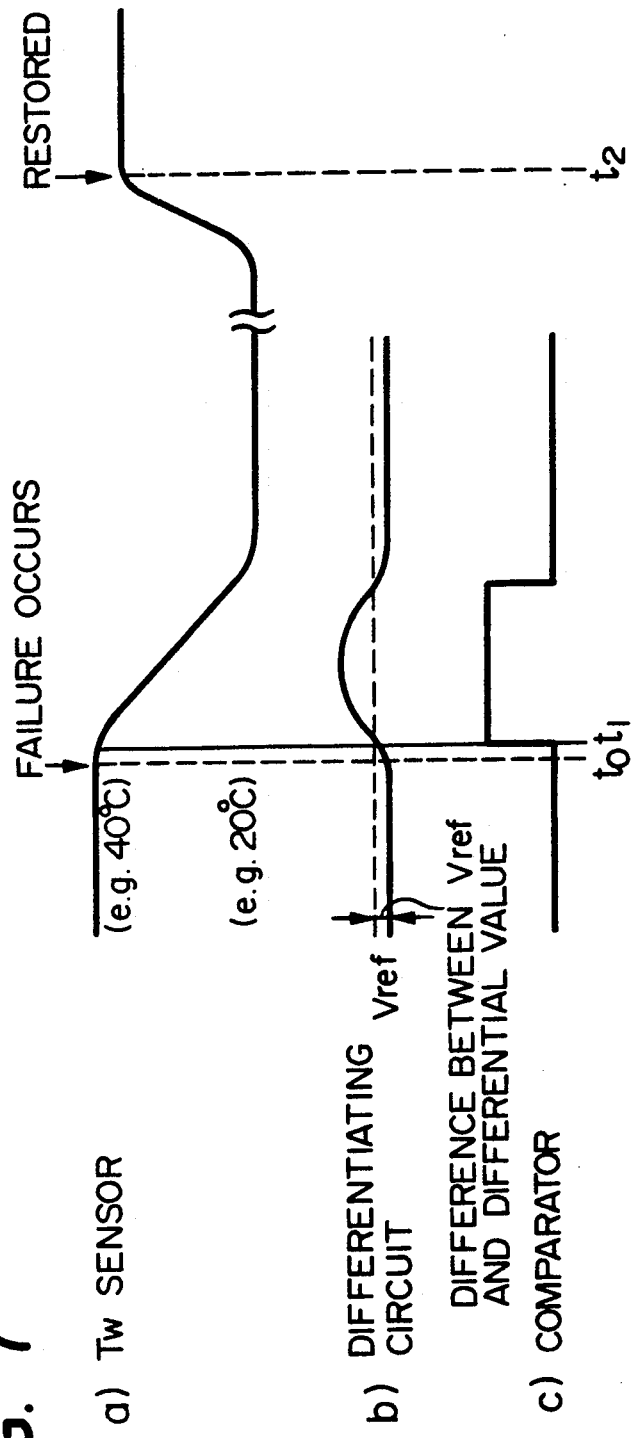

FAIL-SAFE DEVICE FOR TEMPERATURE SENSORS

BACKGROUND OF THE INVENTION

This invention relates to a fail-safe device for temperature sensors, and more particularly to a device of this type for temperature sensors used for electronically controlling an internal combustion engine.

Various sensors used for controlling an internal combustion engine include a sensor for detecting the temperature of the engine such as an engine coolant temperature sensor. In general, the engine coolant temperature is detected as representing the engine temperature, and used for various engine control such as fuel injection control. An engine coolant temperature sensor for such applications is required to always generate an output indicative of accurate engine coolant temperature for proper control of the engine. Therefore, if a failure occurs in the sensor, it should be positively detected to thereby take a fail-safe action.

A fail-safe device is known, which detects a failure in the coolant temperature sensor and effects a fail-safe action upon detection of the failure. The device uses a thermistor to detect a failure in the sensor by detecting a terminal voltage of the thermistor, and upon detection of the failure it effects such a fail-safe action as replacement of the actual output value of the sensor by a substitutive value. More specifically, the output value of the sensor is compared with predetermined upper and lower limit values, and if it does not fall within a range between the upper and lower limit values, the sensor is judged to be abnormal, and then the sensor output is replaced by a predetermined substitutive value upon judgement of an abnormality in the sensor.

However, in the above conventional device, the upper and lower limit values are provided for detecting complete disconnection or complete short-circuit in the sensor, so that incomplete disconnection or incomplete short-circuit, i.e. disconnection or short-circuit in which there is some resistance between the power source or the ground and the point at which disconnection or short-circuit occurs cannot be detected, if it exists. Specifically, in the conventional device, the sensor is judged to be abnormal basically when the sensor output value falls out of the range within which it actually can fall when the sensor is normally functioning (for example, the output value becomes equal to the power source voltage upon occurrence of disconnection, while it becomes 0 upon occurrence of short-circuit). Therefore, although complete disconnection or complete short-circuit can be detected, if incomplete failure as mentioned above has occurred and hence the output value falls within the range within which it can fall when the sensor is normally functioning, the sensor is determined to be normal in spite of occurrence of incomplete failure.

If such incomplete failure cannot be detected, the control system can malfunction, failing to carry out accurate control of the engine. That is, in the case that incomplete failure occurs in the sensor, although the sensor output value falls within the range within which it can fall when the sensor is normally functioning, it does not correspond to the actual coolant temperature. The conventional fail-safe device cannot determine the sensor in such an incompletely faulty condition to be abnormal. As a result, the sensor gives, for example, an output indicative of a low coolant temperature even when the actual coolant temperature is high, so that the control system erroneously judges that the engine is in a low temperature condition, and hence controls the fuel injection amount to a value to be applied at the low engine temperature, i.e. the injection amount is erroneously increased.

SUMMARY OF THE INVENTION

It is the object of the invention to provide a fail-safe device for temperature sensors, which is capable of also accurately detecting incomplete failure in the sensor, and at the same time effecting a proper fail-safe action upon detection of the failure.

To attain the above object, the present invention provides a fail-safe device for a temperature sensor for detecting a temperature of an internal combustion engine, comprising:

renewal means for renewing a value of the temperature of the engine detected by the temperature sensor and storing the renewed value, the stored renewed value ($T_{WCN}$) being applied to control of operation of the engine;

low temperature region detecting means (steps 302, 413) for determining whether or not the temperature of the engine is in a low temperature region lower than a predetermined value ($T_{WZ}$) on the basis of the detected value of the temperature from the temperature sensor; and renewal inhibiting means (step 410) for inhibiting renewal of the detected value from the temperature sensor by the renewal means when the detected value ($T_{WFIL} = T_{WAD}$) has decreased, while the low temperature region detecting means detects the low temperature region.

Preferably, the renewal inhibiting means determines that the detected value ($T_{WAD} = T_{WFIL}$) from the temperature sensor has decreased, when the detected value is lower than a lower limit value ($T_{WLOLM}$) set in response to an output value of the low temperature region detecting means.

More preferably, the lower limit value ($T_{WLOLM}$) is set to a value ($T_{WAD}-\Delta d$, $T_{WCN}-\Delta d$) corresponding to the detected value from the temperature sensor when the low temperature region detecting means detects the low temperature region, while it is set to the predetermined value ($T_{WZ}$) when the low temperature region detecting means does not detect the low temperature region.

Further preferably, the lower limit value ($T_{WLOLM}$) set when the low temperature region detecting means detects the low temperature region is a value ($T_{WAD}-\Delta d$, $T_{WCN}-\Delta d$) lower than the detected value from the temperature sensor by a predetermined amount ($\Delta d$).

Preferably, second renewal inhibiting means (step 407) is provided for inhibiting renewal of the detected value ($T_{WAD}$) from the temperature sensor by the renewal means when the detected value from the temperature sensor has not remained within a predetermined range ($T_{WFIL}-\alpha - T_{WFIL}+\alpha$) over a predetermined time period ($t_{TWF}$).

The above and other objects, features, and advantages of the invention will be more apparent from the ensuing detailed description taken in conjunction with the accompanying drawings.

BRIEF DESCRIPTION OF THE DRAWINGS

FIG. 6 is a block diagram illustrating a circuit for detecting a decrease in the output of a $T_W$ sensor appearing in FIG. 1 on the basis of a differential value of the output; and (a), (b), and (c) of FIG. 7 are graphs showing changes in the outputs of the $T_W$ sensor, a differentiating circuit, and a comparator of the circuit of FIG. 6 when there has occurred incomplete failure in the $T_W$ sensor.

DETAILED DESCRIPTION

The invention will now be described in detail with reference to the drawings showing an embodiment thereof.

Figure 1:
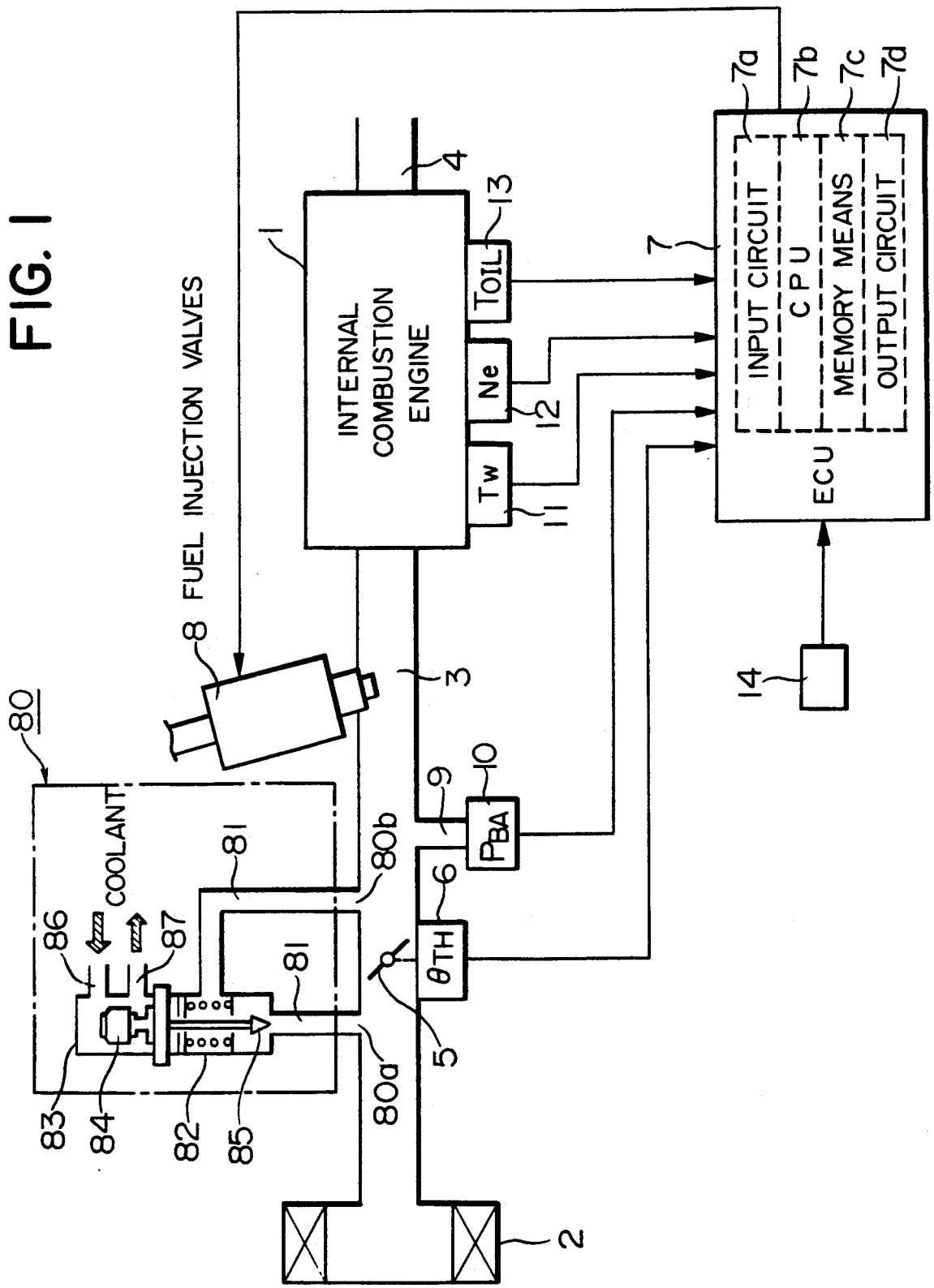
FIG. 1 is a block diagram illustrating the whole arrangement of a fuel supply control system, to which the device of the invention is applied.

Referring first to FIG. 1, there is schematically illustrated the entire arrangement of a fuel supply control system for an internal combustion engine, which incorporates the device of the invention. In FIG. 1, reference numeral 1 designates an internal combustion engine 1, which is a four cylinder type, for example, to which are connected an intake pipe 3 having an air cleaner 2 at an open end thereof, and an exhaust pipe 4. Arranged in the intake pipe 3 is a throttle valve 5, to which is connected a throttle valve opening $\theta_{TH}$ sensor 6 for supplying an electric signal indicative of the sensed throttle valve opening $\theta_{TH}$ to an electronic control unit (hereinafter called "the ECU") 7.

Openings 80a and 80b are formed through the peripheral wall of the intake pipe 3, respectively, at locations upstream and downstream of the throttle valve 5. The openings 80a and 80b are connected to each other by a bypass passage 81, across which is arranged a fast idling mechanism 80. More specifically, the fast idling mechanism 80 has a fast idling valve 82 arranged across the bypass passage 81.

The fast idling valve 82 is formed by a thermo valve of wax-driven type, and comprises a coolant circulating chamber 83, a vessel 84 having high thermal conductivity, which is accommodated in the chamber 83 and within which a wax pellet, not shown, is enclosed, and a valve body 85 which has its opening varied in accordance with contraction and expansion of the wax pellet.

Figure 5:
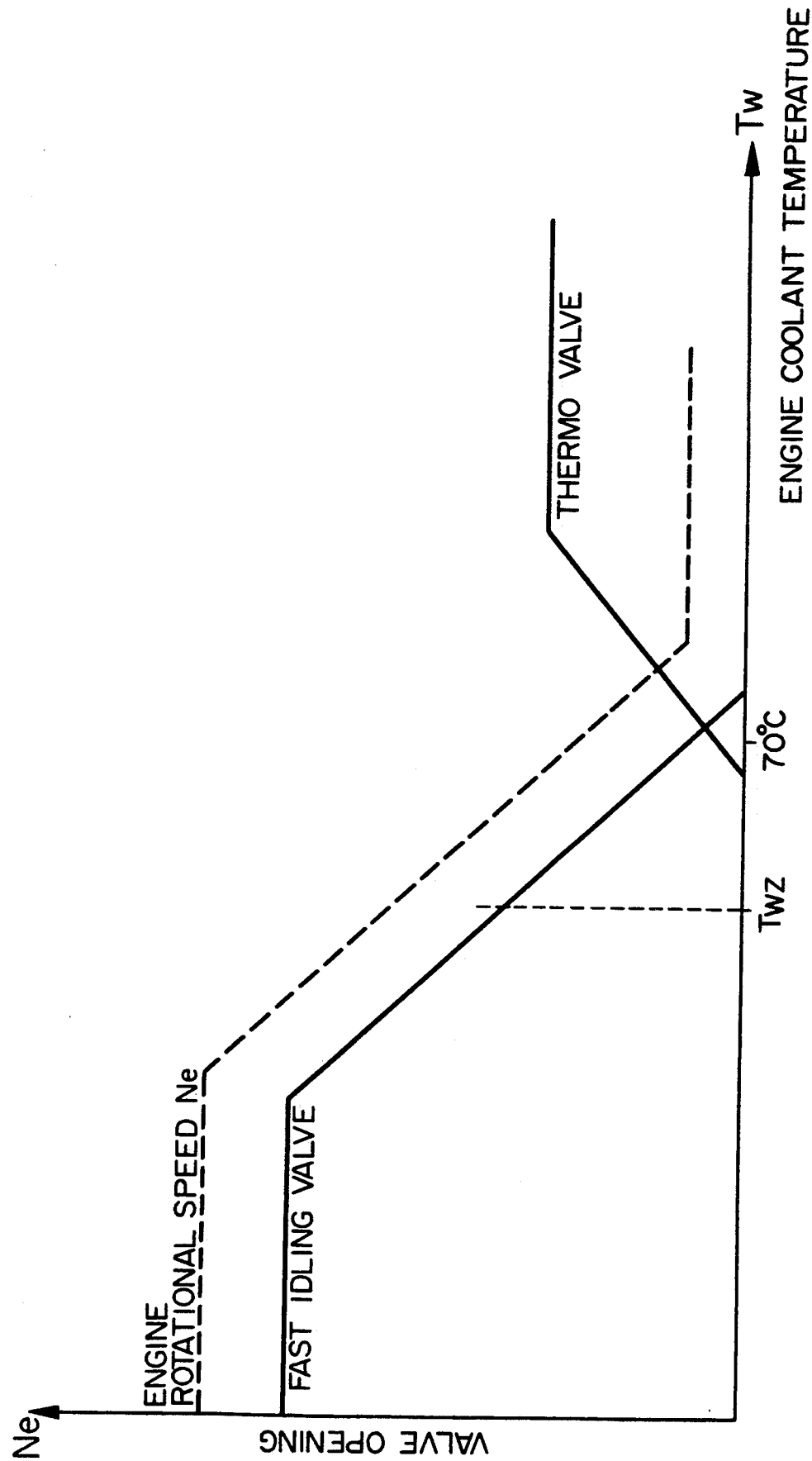
FIG. 5 is a graph showing an example of the relationship between the coolant temperature, the rotational speed of the engine, and the opening degrees of a fast idling valve and a thermo valve appearing in FIGS. 1 and 2, respectively.

When the engine coolant temperature is low, an amount of air flow bypassing the throttle valve 5 is automatically controlled by the fast idling mechanism 80 to a large value to thereby control the engine rotational speed to a proper or high value. On the other hand, as the engine coolant temperature rises, the wax becomes expanded to cause the valve 82 to be gradually closed, so that the flow rate of the bypassing air is reduced to thereby automatically and smoothly decrease the engine rotational speed, as shown in FIG. 5. When the engine coolant temperature reaches a predetermined value, fast idling is terminated.

Figure 2:
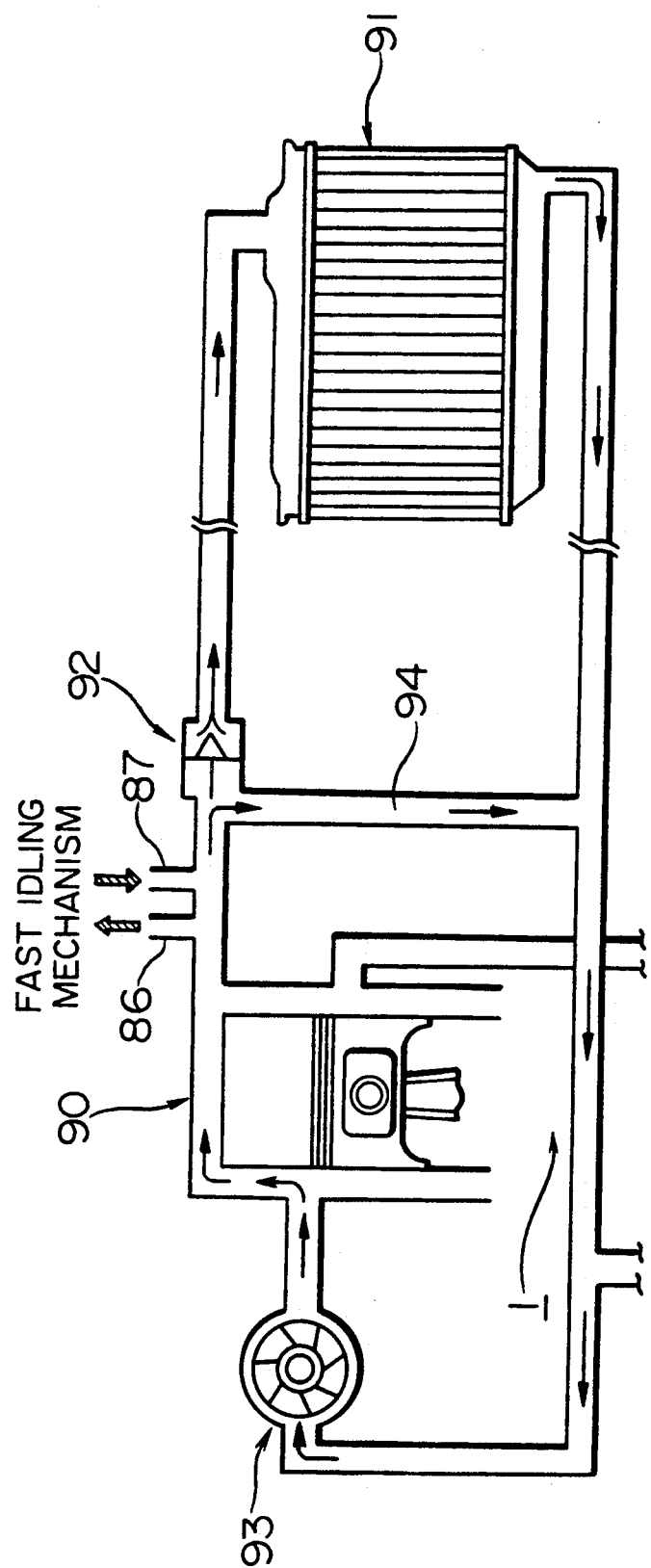
FIG. 2 is a block diagram illustrating an example of an engine coolant system.

The coolant circulating chamber 83 is connected to a coolant passage system 90 through conduits 86, 87, as shown in FIG. 2. A thermo valve 92 of wax-driven type is arranged in the coolant passage 90 at a location between the cylinder block of the engine 1 and a radiator 91. The thermo valve 92 is driven by a wax pellet thereof, which has a coefficient of thermal expansion proportional to the engine coolant temperature, similarly to the fast idling valve 82, in such a manner that it is open as the coolant temperature increases, reversely to the fast idling valve 82. That is, when the coolant temperature is low, the thermo valve 92 is closed, whereas it becomes open as the coolant temperature rises, as shown in FIG. 5.

During warming-up of the engine 1 during which the thermo valve 92 is closed, the engine coolant is circulated by a water pump 93 within a circuit formed by a water jacket, not shown, of the engine 1 and a bypass passage 94, to thereby promote warming-up of the engine 1. On the other hand, when the thermo valve 92 becomes open as the coolant temperature increases, hot coolant after cooling the engine 1 returns to the radiator 91 through the thermo valve 92.

Referring again to FIG. 1, fuel injection valves 8, only one of which is shown, are provided for respective cylinders of the engine 1 in a manner being projected into the interior of the intake pipe 3 at locations between the engine 1 and the opening 80b and upstream of respective intake valves, not shown. The fuel injection valves 8 are connected to a fuel pump, not shown, and also electrically connected to the ECU 7, which in turn controls the fuel injection period of the valves 8.

An intake pipe absolute pressure $P_{BA}$ sensor 10 is provided in communication through a conduit 9 with the interior of the intake pipe 3, for supplying an electric signal indicative of the sensed absolute pressure $P_{BA}$ to the ECU 7.

An engine coolant temperature $T_W$ sensor 11 as an engine temperature sensor for sensing the engine temperature, which may be formed of a thermistor or the like, is mounted in the peripheral wall of a cylinder block of the engine 1 within which the coolant is filled, for supplying the ECU 7 with an electric signal indicative of the sensed engine coolant temperature $T_W$ representing the engine temperature.

An engine rotational speed Ne sensor 11 is arranged in facing relation to a camshaft or a crankshaft of the engine, neither of which is shown. The engine rotational speed sensor 11 generates a pulse as a TDC signal pulse at each of predetermined crank angles whenever the crankshaft rotates through 180 degrees, for supplying the pulse to the ECU 7.

The engine 1 is further provided with a lubricating oil temperature $T_{OIL}$ sensor 13 for supplying an electric signal indicative of the sensed oil temperature to the ECU 7.

Further connected to the ECU 7 is an ignition switch 14 of the engine 1 for supplying an electric signal indicative of the on-off state of the switch 14.

The ECU 7 comprises an input circuit 7a having functions of shaping waveforms of pulses of input signals from various sensors, shifting voltage levels of input signals from some sensors, and converting analog values of the input signals into digital signals, etc., a central processing unit (hereinafter called "the CPU") 7b, memory means 7c storing various operational programs to be executed within the CPU 7b, including programs for abnormality detection and fail-safe control of the engine temperature sensor, hereinafter described, as well as for storing various calculated data from the CPU 7b, and an output circuit 7d for supplying driving signals to the fuel injection valves 8.

The CPU 7b operates in synchronism with generation of TDC signal pulses to determine operating conditions of the engine 1, in response to engine parameter signals supplied from various sensors, and calculate a fuel injection period $T_{OUT}$ for which the fuel injection valves 8 should be opened, to such values as to optimize various operating characteristics of the engine 1 suh as fuel consumption and accelerability, in accordance with the determined engine operating conditions, by the use of the following equation (1):

$$T_{OUT} = T_i \times K_1 \times K_2 + K_3 \qquad (1)$$

where Ti represents a basic value of the valve opening period for the fuel injection valves 8, which is read from a Ti map, not shown, in response to the intake pipe absolute pressure $P_{BA}$ and the engine rotational speed Ne.

$K_1$ represents an engine warming-up fuel-increasing coefficient whose value is read from a table, not shown but stored in the memory means 7c, in response to the intake pipe absolute pressure $P_{BA}$ and the engine rotational speed Ne. A control value $T_{WCN}$ based on the sensed coolant temperature by the $T_W$ sensor 11 is applied to retrieval of the table.

$K_2$ and $K_3$ represent other correction coefficients and correction variables, respectively, which are calculated on the basis of engine operating parameter signals from various sensors to such values as to optimize various operating characteristics of the engine such as fuel consumption and exhaust emission characteristics.

The CPU 7b supplies the fuel injection valves 8 via the output circuit 7d with respective driving signals based on the fuel injection period $T_{OUT}$ calculated as above.

The CPU 7b also operates to detect abnormality in the temperature detection system and carries out fail-safe operation in the case of occurrence of such abnormality. Specifically, it determines, in accordance with a predetermined program stored in the memory means 7c, whether or not the temperature sensor, e.g. the $T_W$ sensor 11 in the present embodiment, is malfunctioning. If malfunctioning of same is detected, the CPU 7b carries out a fail-safe operation of replacing the control value $T_{WCN}$ based on the output $T_W$ of the $T_W$ sensor 11 by a predetermined value $T_{WO}$.

Figure 3:
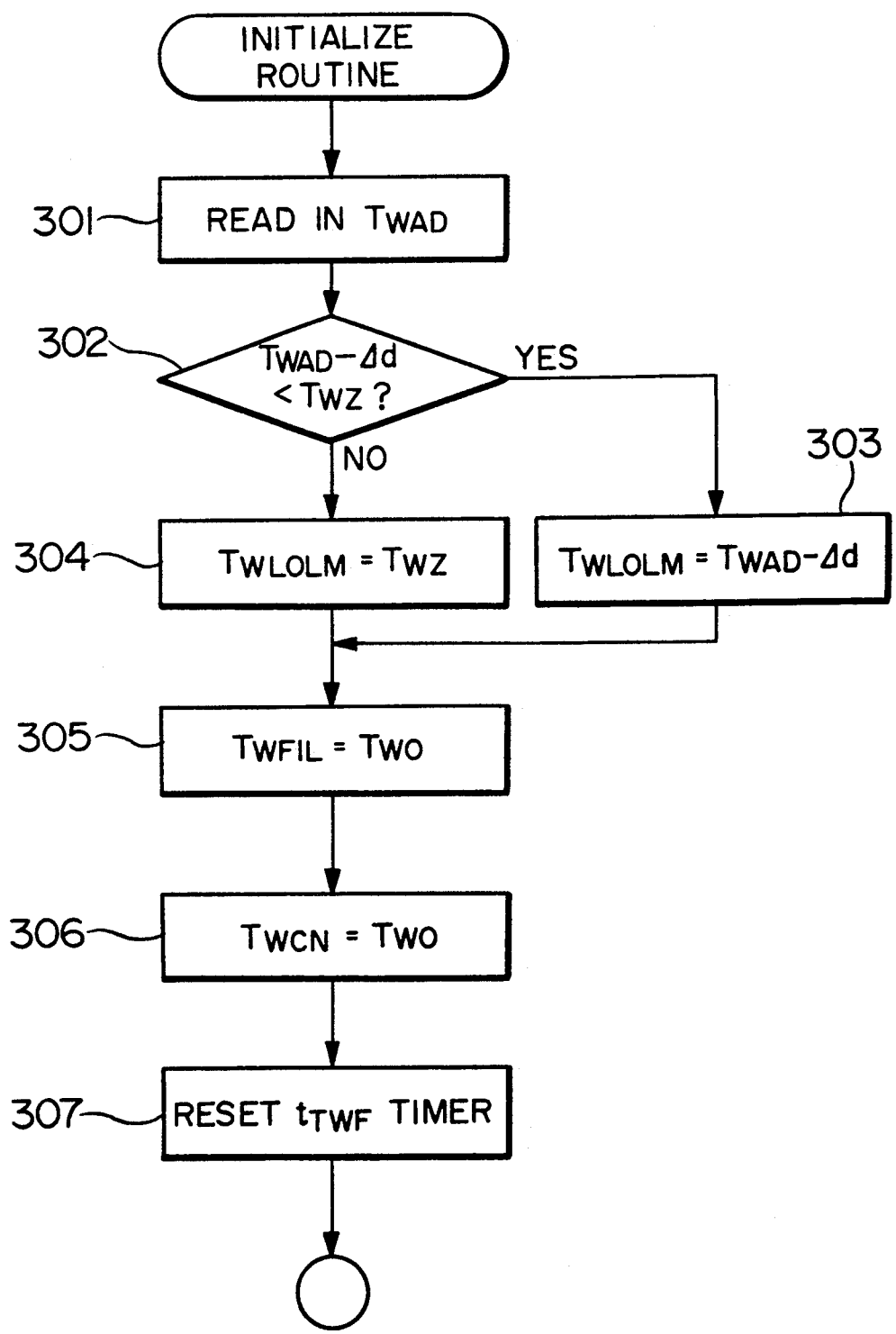
FIG. 3 is a flowchart of an initialize routine for fail-safe control.
Figure 4B:
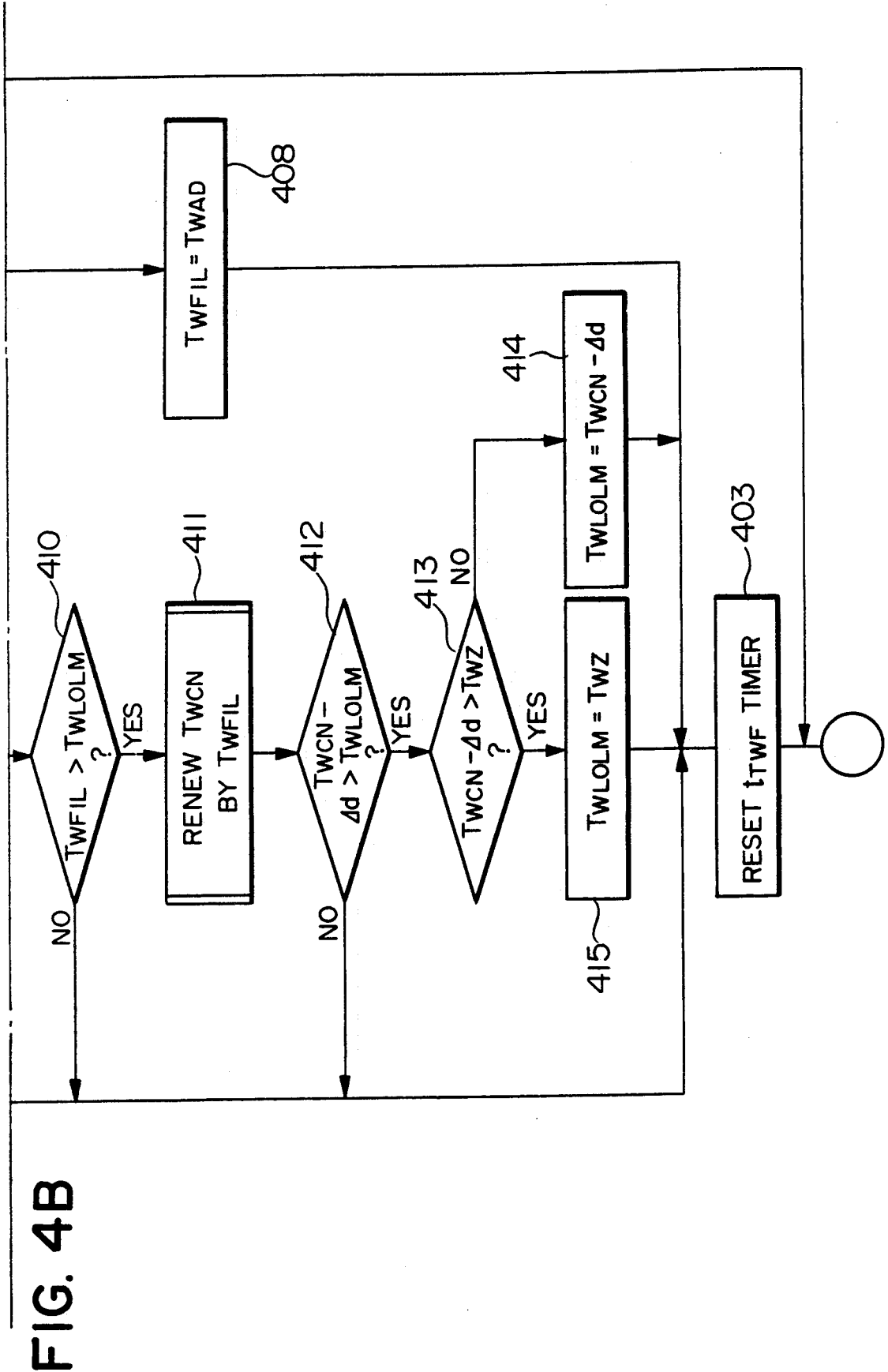
FIG. 4 is a flowchart of a main program for the fail-safe control.

FIGS. 3 and 4 show fail-safe control programs for the $T_W$ sensor 11, which are executed in the CPU 7b.

The program of FIG. 3 is an initialize routine which is executed only one time upon turning-on of the ignition switch 14, while the program of FIG. 4 is executed in a repeated manner as a background routine during intervals between executions of a main program for controlling the fuel supply, after the initialize routine is once effected upon turning-on of the ignition switch 14.

Specifically, referring first to FIG. 3, at a step 301, a detected coolant temperature value $T_{WAD}$ is read in, which is obtained by A/D conversion of an output signal from the $T_W$ sensor 11, followed by the program proceeding to the next step 302 where the value $T_{WAD}$ is compared with a predetermined value. In the embodiment, a predetermined permissible margin $\Delta d$ is provided for the value $T_{WAD}$. That is, at the step 302, it is determined whether or not a value ($T_{WAD} - \Delta d$) obtained by substracting the predetermined value $\Delta d$ from the value $T_{WAD}$ read in at the step 301 is lower than a predetermined discriminating coolant temperature value $T_{WZ}$ for discriminating a warming-up condition of the engine 1. If the answer at the step 302 is Yes, that is, if $T_{WAD} - \Delta d < T_{WZ}$, which indicates that the engine coolant temperature is low, the difference ($T_{WAD} - \Delta d$) is set, at a step 303, as an initial value of a renewal limit value $T_{WLOLM}$ for the control temperature $T_{WCN}$, which is applied at a step 410 of the main program shown in FIG. 4, hereinafter referred to. If the answer is No, that is, if $T_{WAD} - \Delta d \geq T_{WZ}$, which indicates that the engine coolant temperature is high, the value $T_{WZ}$ is set, at a step 304, as the initial value of the value $T_{WLOLM}$, followed by the program proceeding to a step 305.

The predetermined value $\Delta d$ to be subtracted from the value $T_{WAD}$ read in at the step 301 is set e.g. at 5 LSB, e.g. 5° C.

The predetermined discriminating coolant temperature value $T_{WZ}$ is an upper limit value of the value $T_{WLOLM}$, which is lower than a valve-opening temperature at which the thermo valve 92 described above with reference to FIG. 2 is to be opened, and at the same time which is set at a value within a coolant temperature range in which the fast idling mechanism 80 in FIG. 1 operates, that is, the fast idling valve 82 is open.

This setting of the renewal limit value $T_{WLOLM}$ is based on the following ground:

When the engine temperature increases to reach the valve-opening temperature of the thermo valve 92, the thermo valve 92 becomes open so that the coolant starts to circulate between the radiator 91 and the engine 1. At the start of the circulation, the coolant temperature temporarily drops.

In this connection, the present inventors have noted the fact that the coolant temperature only increases until it reaches a predetermined value after the start of the engine, and therefore in the case where the coolant temperature drops before it reaches the predetermined value, it can be presumed that there has occurred an abnormality in the $T_W$ sensor 11 in use. The present invention is intended to detect, on the basis of this fact, even an incomplete failure in the $T_W$ sensor 11 due to incomplete disconnection or incomplete short-circuit, and effect a fail-safe operation in such event.

Further, although abnormality detection of the invention based on the above fact makes it possible to detect even incomplete failure in the sensor which cannot be detected in the conventional manner, it is better to enable to determine whether the drop in the coolant temperature is really due to an incomplete failure in the $T_W$ sensor 11 or due to another factor, i.e. opening of the thermo valve 92, in order to more accurately detect incomplete failure.

Therefore, according to the invention, the predetermined discriminating coolant temperature value $T_{WZ}$, which is applied at the steps 302 and 304 in FIG. 3 and steps 413 and 415 in FIG. 4, hereinafter referred to, is set at a value which fulfills the following conditions. That is, when the engine temperature is high to cause the thermo valve 92 to become open, the coolant circulates from the radiator 91 into the engine to thereby reduce the engine temperature and hence the output value from the $T_W$ sensor 11. Therefore, the value $T_{WZ}$ should be lower than the valve-opening temperature of the thermo valve 92, in order to prevent misjudgement that a failure has occurred in the $T_W$ sensor 11 in such a case. By thus carrying out determination of a failure in the $T_W$ sensor 11 in a low temperature range lower than the predetermined temperature $T_{WZ}$, in which the determination cannot be influenced by opening of the thermo valve 92, incomplete failure can be more accurately detected without misjudgement.

At the same time, the value $T_{WZ}$ should be set at a value within a coolant temperature range in which the fast idling mechanism 80 operates.

That is, when the fast idling mechanism operates after the start of the engine 1, the engine rotational speed Ne becomes rather high, as shown in FIG. 5. In this state, the number of combustions per unit time and hence the amount of heat produced by the cumbustion are large due to high engine rotational speed. Therefore, while the engine rotational speed Ne is high by the operation of the fast idling mechanism 80, the amount of heat produced by the engine 1 is larger than that radiating from the engine 1, so that the engine temperature necessarily increases to thereby increase the coolant temperature. Therefore, if the output value from the $T_W$ sensor 11 decreases after the start of the engine 1 but not down to a predetermined lower limit that the sensor 11 can show during normal operation thereof, it can be judged with high probability that there exists an incomplete disconnection in the $T_W$ sensor 11.

In view of this, the value $T_{WZ}$ should be set at a value lower than a value at which the fast idling mechanism 80 stops operating.

Therefore, the value $T_{WZ}$ is set by taking into consideration the above-mentioned relationship between the operation of the fast idling mechanism 80 and/or the thermo valve 92 and the engine coolant temperature $T_W$. In the embodiment, the fast idling valve 82 and the thermo valve 92 have respective characteristics shown in FIG. 5, and a coolant temperature value at which the former is closed and a coolant temperature value at which the latter becomes open are in the vicinity of 70° C., so that the value $T_{WZ}$ is set at 50° C.

At the step 304 in FIG. 3, when the difference ($T_{WAD}-\Delta d$) is larger than the value $T_{WZ}$, the renewal limit coolant temperature $T_{WLOLM}$ is set to the value $T_{WZ}$ set as described above. That is, if the coolant temperature is already high at the start of the engine, the value $T_{WLOLM}$ is set to the value $T_{WZ}$, followed by the program proceeding to a step 305 et seq.

At the step 305, a filtering coolant temperature value $T_{WFIL}$ for filtering out fluctuations contained in the output of the $T_W$ sensor 11 is set, as an initial value, to a substitutive value $T_{WO} (\geq T_{WZ})$ for fail safe (F/S), and at a step 306, the control value $T_{WCN}$ for engine control is also set to the fail safe-substitutive value $T_{WO}$ as an initial value. At a step 307, a $t_{TWF}$ timer (down counter) for counting a time period $t_{TWF}$ required for the filtering is set to a predetermined value, e.g. 0.5 sec., followed by termination of the program.

Although the initial value $T_{WO}$ of the value $T_{WCN}$ set at the step 306 is once stored in the memory means 7c, it is renewed to a value later detected by the $T_W$ sensor 11 in accordance with the program in FIG. 4, while the renewal is inhibited under predetermined conditions.

Then, the program of FIG. 4 will be explained. As described above, this program is executed as a background routine during intervals between executions of the main program for controlling the fuel supply.

At a step 401, it is determined whether or not a fail-safe action has already been executed. Since there are various factors which require execution of the fail-safe action, it is determined at the step 401 whether or not the fail-safe action due to one or more of the factors has already been executed. If the answer is Yes, the program proceeds to a step 402 where the control value $T_{WCN}$ is set to the substitutive value $T_{WO}$, and then to a step 403 where the $t_{TWF}$ timer is reset, followed by termination of the program. By thus applying the substitutive value $T_{WO}$ as the $T_{WCN}$ value, the fuel injection control and other control continue to be effected.

If the answer at the step 401 is No, it is determined at a step 404 whether or not the coolant temperature value $T_{WAD}$ detected in the present loop is higher than a predetermined upper limit value $T_{WH}$ which can be assumed when the $T_W$ sensor 11 is normally functioning, while it is determined at a step 405 whether or not it is lower than a predetermined lower limit value $T_{WL}$ which can be assumed when the $T_W$ sensor 11 is normally functioning. That is, these steps are provided for checking whether there exists complete disconnection or complete short-circuit in the $T_W$ sensor 11. If the answer at the step 404 or 405 is Yes, the $T_W$ sensor 11 is judged to have complete disconnection or complete short-circuit, so that it is determined at a step 406 that the fail-safe action should be executed, followed by execution of the step 402, i.e. replacing the control value $T_{WCN}$ by the substitutive value $T_{WO}$, execution of the step 403, and termination of the program. After replacement of the control value $T_{WCN}$ by the substitutive value $T_{WO}$, the fuel injection control and other control continue to be effected by the use of the value $T_{WO}$.

On the other hand, if the answers at the steps 404 and 405 are both No, that is, if $T_{WL} \leq T_{WAD} \leq T_{WH}$, which indicates that there exists neither complete disconnection nor complete short-circuit in the $T_W$ sensor 11, the program proceeds to a step 407 et seq.

At the step 407, it is determined whether or not the coolant temperature value $T_{WAD}$ of the $T_W$ sensor 11 detected in the present loop is higher than a value ($T_{FIL}-\alpha$) obtained by substracting a predetermined value $\alpha$, e.g. 2 LSB, from the filtering coolant temperature value $T_{WFIL}$, and at the same time it is determined whether or not the value $T_{WAD}$ is lower than a value ($T_{FIL}+\alpha$) obtained by adding the predetermined value to the value $T_{WFIL}$.

If the present loop is the first loop after the execution of the initialize routine of FIG. 3, the value $T_{WFIL}$ has just been set to the value $T_{WO}$ as the initial value, so that at the step 407 in the present loop, it is determined whether or not ($T_{WO}-\alpha) \leq T_{WAD} \leq (T_{WO}+\alpha$) holds. If the coolant temperature is not in the vicinity of the value $T_{WO}$ after the start of the engine 1, the answer at the step 407 becomes No, and in this case the value $T_{WFIL}$ is set to the value $T_{WAD}$ at a step 408, followed by termination of the program. That is, if the initial value of the value $T_{WFIL}$ is deviated from the detected coolant temperature value $T_{WAD}$, the step 408 is executed, and at the same time the step 403 is executed to reset the $t_{TWF}$ timer.

Also in subsequent loops, if the value $T_{WAD}$ does not fall within the range of ($T_{WFIL} \pm \alpha$), the value $T_{WFIL}$ is set to the value $T_{WAD}$.

If the answer at the step 407 is Yes, that is, if ($T_{WFIL}-\alpha) \leq T_{WAD} \leq (T_{WFIL}+\alpha$), which indicates that the value $T_{WAD}$ falls within the predetermined discriminating range ($T_{WFIL} \pm \alpha$), it is determined at a step 409 whether or not the count value of the $t_{TWF}$ timer has become 0, to judge whether or not the value $T_{WAD}$ has remained within the predetermined range of ($T_{WFIL} \pm a$) over a predetermined period of time $t_{TWF}$. If the answer at the step 409 is No, that is, if the predetermined time period $t_{TWF}$ has not elapsed yet, the program is immediately terminated without execution of renewal of the value $T_{WCN}$ at a step 411, hereinafter referred to, whereas if the answer at the step 409 is Yes, that is, if the predetermined time period $t_{TWF}$ has elapsed, the program proceeds to a step 410 et seq.

The steps 407 and 409 is provided in order to effect stable detection of abnormality without being influenced by fluctuations in the value $T_{WAD}$. More specifically, when there exist undesirable fluctuations in the output value of the $T_W$ sensor 11 due to spike noise or the like, the steps 407 and 409 serve to filter out such fluctuations. By thus filtering out the fluctuations, detection of incomplete failure can be effected with accuracy without being effected by an instantaneous variation in the sensor output value.

At the step 410, it is determined whether or not the value $T_{WFIL}$ is higher than the renewal limit coolant temperature value $T_{WLOLM}$. If the answer is Yes, the program proceeds to a step 411 et seq. to carry out renewal of the control value $T_{WCN}$ by the use of the value $T_{WFIL}$, etc. This renewal is made, e.g. by setting the control value $T_{WCN}$ to the value $T_{WFIL}$ and storing the new value $T_{WCN}$. The renewed value $T_{WCN}$ is applied to the fuel injection control and other engine control. The renewal limit coolant temperature value $T_{WLOLM}$, when used as the initial value at the step 410 in the first loop of the program in FIG. 4, is set to the difference ($T_{WAD} - \Delta d$) set at the step 303 or to the predetermined value $T_{WZ}$ set at the step 304. In subsequent loops, a value ($T_{WCN} - \Delta d$) obtained by subtracting the predetermined value $\Delta d$ from the control value $T_{WCN}$ is applied as the value $T_{WLOLM}$ at a step 414, while the predetermined value $T_{WZ}$ is applied as the value $T_{WLOLM}$ at a step 415. That is, in the region in which the coolant only increases, the comparison at the step 410 is carried out by the use of the value ($T_{WAD} - \Delta d$) or the value ($T_{WCN} - \Delta d$) as the value $T_{WLOLM}$, so that if the $T_W$ sensor 11 is normally functioning to indicate a continuous increase in the coolant temperature, the answer at the step 410 is Yes to thereby effect renewal of the value $T_{WCN}$ at the step 411 whenever the program is executed. Also in the region in which the coolant temperature alternately increases and decreases, the coolant temperature is higher than the predetermined fixed value $T_{WZ}$, and accordingly renewal of the value $T_{WCN}$ is effected. In the latter region, the coolant temperature can temporarily decrease due to termination of operation of the fast idling mechanism 82 or opening of the thermo valve 92. However, even when the coolant temperature decreases, the value $T_{WFIL}$ is higher than the value $T_{WLOLM}$ since the value $T_{WLOLM}$ is set at the fixed value $T_{WZ}$, so that renewal of the value $T_{WCN}$ is also effected similarly to the case where the coolant temperature increases. Thus, the control value $T_{WCN}$ is applied to the fuel injection control etc. both when the coolant temperature increases and when it decreases.

Further, in the region in which the coolant temperature only increases, the control value $T_{WCN}$ is also renewed when the coolant temperature in the present loop is lower than that in the last loop by a value which is smaller than the predetermined value ($\Delta d$). Although the coolant temperature does not drop in principal in the region in which the coolant temperature only increases, there can be a case when it drops even slightly. Such a case should be discriminated from an abnormal case in which incomplete failure occurs, if the amount of the drop is smaller than the predetermined value. Thus, a permissible margin for the drop is provided.

Specifically, when the value ($T_{WAD} - \Delta d$) or ($T_{WCN} - \Delta d$) is applied as the value $T_{WLOLM}$ at the step 410, even if the value $T_{WFIL}$ in the present loop is lower than that in the last loop, the answer to the step 410 is Yes insofar as the amount of the drop in the value $T_{WFIL}$ is smaller than the predetermined value $\Delta d$, thereby permit renewal of the value $T_{WCN}$ to the value $T_{WFIL}$ in the present loop at the step 411. That is, it is determined that the $T_W$ sensor 11 is normally functioning without incomplete failure, insofar as the amount of the drop in the value $T_{WFIL}$ is small.

On the other hand, if the answer at the step 410 is No, that is, if $T_{WFIL} \leq T_{WLOLM}$, it is judged that there occurs incomplete failure in the $T_W$ sensor 11, to thereby inhibit renewal of the control value $T_{WCN}$, that is, maintain the value $T_{WCN}$ at the value assumed in the last loop, followed by execution of the step 403 and then termination of the program. Therefore, for example, so long as the coolant temperature increases within a coolant temperature region below the fixed value $T_{WZ}$, if the output of the TW sensor 11 has abruptly dropped by an amount more than the predetermined value $\Delta d$ although it still remains higher than the lower limit value $T_{WL}$ set at the step 405, dut to occurrence of incomplete disconnection in the $T_W$ sensor 11 with some resistance with respect to the ground, it is judged that there exists abnormality in the output, to thereby prevent the engine control from being adversely affected by the abnormality.

According to the conventional device referred to before, the sensor is judged to be normal even when there occurs incomplete failure, so that a sensor output value indicative of a coolant temperature value lower than the actual value, which is read in upon occurrence of incomplete disconnection, is used. On the other hand, according to the present invention, when the coolant temperature is below the predetermined value $T_{WZ}$, renewal of the control value $T_{WCN}$ is effected only when the coolant temperature increases, that is, when the coolant temperature value is read which decreases in a region where it should only increase, the control value is maintained at a value in the last loop, whereas the control value is renewed when the coolant temperature value which increases is read. Therefore, the fail-safe device of the invention can avoid the engine from being improperly controlled before warming-up of the engine, and further prevent a sudden change in the control value due to incomplete disconnection in the $T_W$ sensor 11 after warming-up of the engine.

After the renewal of the value $T_{WCN}$ at the step 411, it is determined at a step 412 whether or not a value ($T_{WCN} - \Delta d$) obtained by subtracting the predetermined value $\Delta d$ from the control value $T_{WCN}$ renewed at the step 411 is higher than the value $T_{WLOLM}$ set in the last loop. If the answer is No, the step 403 is executed, followed by termination of the program, whereas if the answer is Yes, the program proceeds to a step 413 et seq. The above step 412 is for effecting the renewal of the value $T_{WLOLM}$ only when the value $T_{WCN}$ changes toward a higher value (i.e. when $T_{WCN} > T_{WLOLM} + \Delta d$). If the step 412 is omitted, the value $T_{WLOLM}$ can be renewed at a step 414, hereinafter referred to, when the coolant temperature lowers while it is below the predetermined value $T_{WZ}$, so that the answer to the question of the step 410 will be affirmative or Yes, rendering it impossible to detect failure.

At the steps 413–415, the value $T_{WLOLM}$ is set depending upon which of the above described two coolant temperature regions the coolant temperature falls in, similarly to the steps 302–304.

At the step 413, it is determined whether or not the value ($T_{WCN}-\Delta d$) is higher than the fixed value $T_{WZ}$. If the answer is No, the value $T_{WLOLM}$ is set to the value ($T_{WCN}-\Delta d$), whereas if the answer is yes, the value $T_{WLOLM}$ is set to the value $T_{WZ}$. Then, the program proceeds to the step 403 to reset the $t_{TWF}$ timer, and is then terminated.

That is, if the answer at the step 413 is No, the engine is still in the region where the coolant temperature only increases, so that the lower limit value $T_{WLOLM}$ to be applied in the next loop is set to the value ($T_{WCN}-\Delta d$), so as to increase the value $T_{WLOLM}$ in accordance with an increase in the coolant temperature to thereby enable to determine that the $T_W$ sensor 11 is normal, if it is actually normally functioning.

On the other hand, if the answer is Yes, that is, if the engine has shifted from the region where the coolant temperature only increases to the region where it alternately increases and decreases, the lower limit value $T_{WLOLM}$ is set to the value $T_{WZ}$ and held at the value $T_{WZ}$ in subsequent loops, to thereby cope with operation of the fast idling valve 82 and the thermo valve 92 and hence prevent incorrect detection of abnormality.

Further, according to the above described embodiment, incomplete failure is detected by the use of the filtering coolant temperature value $T_{WFIL}$ set to the detected coolant temperature $T_{WAD}$, only when the value $T_{WAD}$ has varied within the range between the value ($T_{WFIL}+\alpha$) and the value ($T_{WFIL}-\alpha$) over the predetermined time period $t_{TWF}$, so that a change in the value $T_{WAD}$ as a result of proper behavior of the actual coolant temperature can be discriminated from that due to noise, to thereby enable to eliminate influence by small noise.

Further, renewal of the control value $T_{WCN}$ is effected even when the value $T_{WAD}$ drops by an amount smaller than the predetermined value $\Delta d$, so that incorrect engine control due to noise can be avoided.

In the above described embodiment, in order to detect that the coolant temperature value $T_{WAD}$ detected by the $T_W$ sensor 11 decreases, it is detected whether or not the control value $T_{WCN}$ in the present loop is lower than the lower limit value $T_{WLOLM}$ determined on the basis of the control value $T_{WCN}$ in the last loop, that is, the control value $T_{WCN}$ in the last loop is higher than that in the present loop. However, the detection of a decrease in the sensor output is not limited to this method, but it may be judged that the sensor output has decreased when a differential value of the sensor output has become negative. In this alternative method, the output of the $T_W$ sensor 11 is supplied to a differentiating circuit, and it is judged that the sensor output has decreased when the output of the differential circuit has become negative.

FIG. 6 shows a circuit for detecting a decrease in the output of the $T_W$ sensor 11 on the basis of a differential value of the output. The $T_W$ sensor 11 has its output terminal connected to an input terminal of an A/D convertor, not shown, in the input circuit 7a of the ECU 7, and also connected to an input terminal of a differentiating circuit 101. The differential circuit 101 has its output terminal connected to an input terminal of a comparator 102, which in turn has its output terminal connected to the CPU 7b. The output voltage of the $T_W$ sensor 11 is converted to a digital signal by means of the A/D convertor to be supplied to the CPU 7b, while it is differentiated by means of the differentiating circuit 101 to be generated as a differential voltage. The comparator 102 compares the differential voltage with a reference voltage Vref corresponding to the predetermined value $\Delta d$, and supplies the CPU 7b with a renewal inhibiting signal for inhibiting renewal of the control value $T_{WCN}$, when the differential voltage exceeds the reference value Vref. If there occurs incomplete failure in the $T_W$ sensor 11, as shown at a time point $t_0$ in (a) of FIG. 7, to cause the output voltage of the $T_W$ sensor 11 to start decreasing, the output voltage of the differentiating circuit 101 starts to increase, as shown in (b) of FIG. 7. Then, when the output voltage of the differentiating circuit 101 exceeds the reference voltage Vref, the output voltage of the comparator 102 is inverted from a low level to a high level to thereby supply the renewal inhibiting signal to the CPU 7b, as shown at a time point $t_1$ in (c) of FIG. 7. The CPU 7b inhibits renewal of the value $T_{WCN}$ in accordance with the renewal inhibiting signal. As described above, the CPU 7b stores in the memory means 7c the output value $T_{WAD}$ of the $T_W$ sensor 11 which is obtained when the output voltage of the comparator 102 is inverted from a low level to a high level, and thereafter continues to inhibit renewal of the value $T_{WCN}$ until the value $T_{WAD}$ reaches the stored value, as shown at a time point $t_2$ in (a) of FIG. 7.

In the case that the output value $T_{WAD}$ of the $T_W$ sensor 11 gently decreases not due to incomplete failure in the sensor 11 but due to small noise or the like, the output voltage of the differentiating circuit 101 does not exceed the reference value Vref to maintain the output voltage of the comparator 102 low, so that renewal of the value $T_{WCN}$ is continued.

Further, although in the above described embodiment, the $T_W$ sensor 11 is used as the engine temperature sensor, another engine temperature sensor e.g. the $T_{OIL}$ sensor 13 which senses the temperature of lubricating oil may be used, instead, since the oil temperature has a similar temperature change characteristic to that of the coolant temperature.

What is claimed is:

1. A fail-safe device for a temperature sensor for detecting a temperature of an internal combustion engine, comprising:

renewal means for renewing a value of the temperature of said engine detected by said temperature sensor and storing the renewed value, the stored renewed value being applied to control of operation of said engine;

low temperature region detecting means for determining whether or not the temperature of said engine is in a low temperature region lower than a predetermined value, on the basis of the detected value of the temperature from said temperature sensor; and renewal inhibiting means for inhibiting renewal of the detected value from said temperature sensor by said renewal means when the detected value has decreases, while said low temperature region detecting means detects said low temperature region.

2. A fail-safe device as claimed in claim 1, wherein said renewal inhibiting means determines that the detected value from said temperature sensor has decreased, when the detected value is lower than a lower limit value set in response to an output value of said low temperature region detecting means.

3. A fail-safe device as claimed in claim 2, wherein said lower limit value is set to a value corresponding to the detected value from said temperature sensor when said low temperature region detecting means detects said low temperature region, while it is set to said predetermined value when said low temperature region detecting means does not detect said low temperature region.

4. A fail-safe device as claimed in claim 3, wherein said lower limit value set when said low temperature region detecting means detects said low temperature region is a value lower than the detected value from said temperature sensor by a predetermined amount.

5. A fail-safe device as claimed in claim 1, including second renewal inhibiting means (step 407) for inhibiting renewal of the detected value from said temperature sensor by said renewal means when the detected value from said temperature sensor has not remained within a predetermined range over a predetermined time period.

6. A fail-safe device as claimed in claim 1, wherein said renewal inhibiting means determines that the detected value from said temperature sensor has decreased, when a differential value of the detected value from said temperature sensor has become a negative value.

7. A fail-safe device as claimed in claim 1, wherein said renewal inhibiting means determines that the detected value from said temperature sensor has decreased, when the detected value from said temperature sensor on an immediately preceding occasion is higher than the detected value from said temperature sensor on a present occasion.

8. A fail-safe device as claimed in claim 1, wherein said engine comprises a cylinder block, a radiator, a coolant passage extending between said cylinder block and said radiator, and a thermo valve arranged in said coolant passage, said thermo valve being disposed to be open when a temperature of the coolant within said coolant passage is higher than a second predetermined value, said predetermined value being set at a value lower than said second predetermined value.

9. A fail-safe device as claimed in claim 1, wherein said engine comprises a throttle valve, and fast idling means operable within a predetermined temperature range for supplying said engine with intake air bypassing said throttle valve, said predetermined value being set within said predetermined temperature range.

* * * * *